United States Patent [19]

Martin

[11] 4,037,190

[45] July 19, 1977

[54] METHOD OF VIBRATORY SEISMIC PROSPECTING FOR MINIMUM CORRELATION NOISE

[75] Inventor: Lincoln A. Martin, Altadena, Calif.

[73] Assignee: Geophysical Systems Corporation, Pasadena, Calif.

[21] Appl. No.: 617,858

[22] Filed: Sept. 29, 1975

Related U.S. Application Data

[63] Continuation-in-part of Ser. No. 617,858, Sept. 29, 1975.

[51] Int. Cl.² ............................................. G01V 1/36
[52] U.S. Cl. ........................... 340/15.5 TA; 235/181; 340/15.5 CC; 340/15.5 DP
[58] Field of Search ............... 340/15.5 TA, 15.5 SC, 340/15.5 CC, 15.5 DP; 235/181; 181/114, 119; 324/77 G; 360/8, 32

[56] References Cited

U.S. PATENT DOCUMENTS

| | | | |
|---|---|---|---|
| 2,920,306 | 1/1960 | Feagin et al. | 235/181 |
| 2,981,928 | 4/1961 | Crawford et al. | 340/15.5 TA |
| 3,417,370 | 12/1968 | Brey | 340/15.5 CC |
| 3,571,788 | 3/1971 | Backus et al. | 340/15.5 CC |
| 3,731,268 | 5/1973 | Landrum, Jr. | 340/15.5 TA |
| 3,883,725 | 5/1975 | Fort et al. | 340/15.5 DP |

*Primary Examiner*—Howard A. Birmiel
*Attorney, Agent, or Firm*—Daniel Silverman

[57] ABSTRACT

A method of carrying out vibratory seismic operations with the object of minimizing correlation noise lobes, comprising, repeating a vibratory source a plurality of times each with a different sweep, having different terminal frequencies, correlating each received signal with its corresponding sweep, and stacking the resultant correlograms. The range in terminal frequencies for the plurality of sweeps should preferably be in the range of one octave or more. Another method of operation is to vary the time durations of the successive sweeps, preferably over a range of 2 to 1, and correlating the received signals and sweeps, and then stacking. In a third method of operation both the time durations and the terminal frequencies are varied. The successive repetitions of the source can be at the same source point and the results straight stacked, or they can be at different independent source points and the results CDP stacked.

16 Claims, 6 Drawing Figures

METHOD OF VIBRATORY SEISMIC PROSPECTING FOR MINIMUM CORRELATION NOISE

CROSS REFERENCES TO RELATED APPLICATIONS

This application is related to and is a continuation in part of my copending application, Ser. No. 617,858, filed Sept. 29, 1975, and entitled: METHOD AND APPARATUS FOR PROCESSING SEISMIC SIGNALS FROM LOW ENERGY SOURCES. Application Ser. No. 617,858 is made part of this application by reference. This application is also related to the U.S. Pats. Nos. 3,881,166 and 3,883,725 of Fort et al.

BACKGROUND OF THE INVENTION

1. Field of the Invention

This invention lies in the field of seismic recording and processing apparatus and methods. More particularly, it lies in the field of vibratory seismic methods. Still more particularly it lies in the field of vibratory seismic methods using a plurality of different sweeps on successive repetitions of the source, whereby the generation of side lobe correlation noise is minimized.

2. Description of the Prior Art

It is well known in the seismic art that since the inception of the vibratory source-correlation systems, some 20 years or more ago, such operations have always been carried out with a plurality of repetitions of the vibratory source at the same point on the earth, and with the same sweep signal. The plurality of received signals were then straight stacked and then correlated with the sweep.

It is, and was, well known also, that in correlating a vibratory signal (such as a reference sweep) with a facsimile of itself, that there were always side lobes recorded as by-products of the correlation. It was known that these side lobes were due to the limited band width of the sweep, and that the wider the frequency bandwidth, the smaller the side lobes. It was also known that the longer the time duration of the sweep, the smaller the side lobes. However, because of the practical difficulties in doing much to improve these conditions, nothing was done.

It is therefore an important object of this invention to operate a vibratory seismic system in a manner to minimize the side lobe correlation noise.

It is a further object of this invention to provide minimum correlation noise while also improving the processing of the signals.

SUMMARY OF THE INVENTION

These and other objects are realized and the limitations of the prior art are overcome in this invention, by choosing on successive repetitions, a group of different sweeps, such that the side lobe of each sweep will be different in time and frequency, such that the noise, when successive repetitions are stacked, will partially cancel each other, and so lessen the total noise.

In the prior art it was well known that because of the limitations of the electro-mechanico-hydraulic vibratory apparatus, there was only a relatively narrow frequency band possible, such as in the range of 10 to 100 Hz. While it was possible to drive such systems to somewhat higher frequencies, because of the time lag of flow of hydraulic fluid and other reasons, the amount of power output decreased rapidly as frequency increased.

This limitation coupled with the self imposed limitation of using a single sweep frequency for successive repetitions of the source, which was based on the self imposed limitation of stacking the records before correlation, made it impossible to do anything toward minimizing the correlation noise due to side lobes.

I have discovered a number of features about seismic vibratory operations, heretofore overlooked by the industry, which makes it possible to operate so as to minimize this noise.

1. I have discovered (as fully described in my copending application Ser. No. 617,858) that it is possible to correlate a 1 bit digitized sweep signal against a 1 bit digitized received signal, to get a 1 digitized correlogram, a plurality of which, resulting from a plurality of repetitions of the source, can be stacked to provide a multi-bit digitized stacked record, which is indistinguishable from the same received signals digitized multibit, and stacked, and then correlated with a multi-bit sweep.

2. I have further discovered that this 1 bit × 1 bit correlation can be carried out so rapidly that the process of correlation before stacking can be done at less cost than conventionalstack and correlate processing.

3. These discoveries further permit CDP stacking in place of straight stacking at no extra cost, and permit very high fold CDP stacking with a consequent great improvement in signal to noise ratio, in the final records and sections.

4. But more important than these, the ability to rapidly correlate before stack permits the new steps of using different sweeps of different terminal frequencies, so that the side lobes generated in correlation, which are a function of terminal frequencies, will cancel when successive correlograms are stacked, thus reducing the inter-reflection side lobe noise due to correlation.

Briefly described, my invention involves;

a. operating a vibratory source with a first vibratory sweep of first pair of terminal frequencies, and/or time duration;

b. digitizing the received signal to 1 bit, and correlating the 1 bit received signal with the 1 bit digitized sweep signal to get a first correlogram, with a first lobe noise;

c. repeating steps (a) and (b) with different terminal frequencies, and/or time durations;

d. stacking the plurality of correlograms, each having different lobe noise, so as to at least partially cancel this noise.

Because of the simplicity of processing the signals, it is possible to operate with high fold CDP stacking to provide a great reduction in side lobe correlation noise.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

Figure 1:
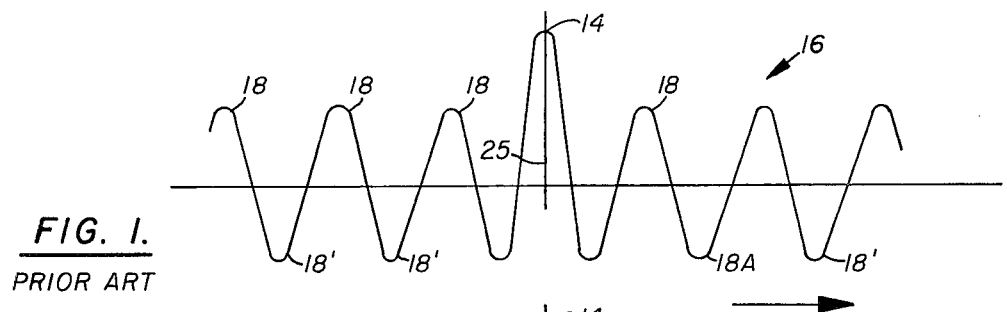
FIG. 1 illustrates the type of side lobe noise obtained with a single sweep configuration for a first sweep.
Figure 2:
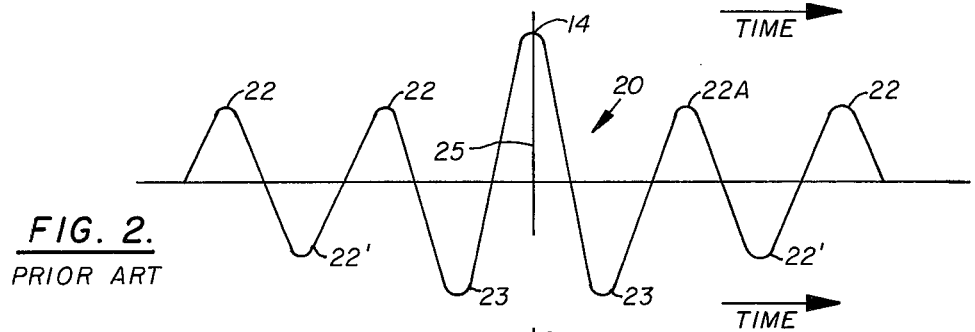
FIG. 2 illustrates the type of side lobe noise obtained with a different single sweep configuration.

Referring now to the drawing, and in particular to FIG. 1, there is shown a correlogram 16. This is obtained by correlating a sweep signal with the corresponding received signal. In FIG. 2 is shown a second correlogram 20 for a different sweep from that of FIG. 1. The two sweeps are different. Both are relatively narrow band, within the overall range of say, 10 to 100 Hz. One may be, for example 10-60 Hz and the other 40-100 Hz. Each correlogram shows, in addition to the principal lobe 14, side lobes 18, for sweep signal 16, and 22 for sweep signal 20. These side lobes are a natural consequence of the short time duration of the sweeps and their narrow frequency band width.

Figure 3:
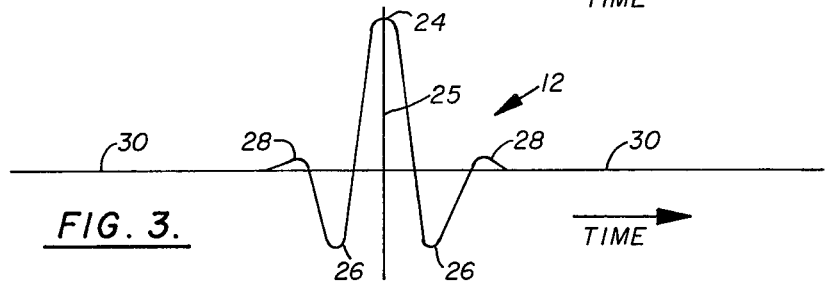
FIG. 3 illustrates the result of using a plurality of sweeps with different terminal frequencies and/or time durations and stacking the correlograms.

In FIG. 3 is shown an ideal correlogram, such as would be obtained with a very long time duration, very wide frequency band width sweep. This correlogram, indicated generally by the number 12, has a principal lobe 24, with minor side lobes 26, 28, which die out or are attenuated timewise, to substantially zero value.

In the vibratory seismic process, using a long sweep signal, of unknown starting and stopping points, it is necessary, to obtain a precise point in time, on the record, where it can be said that a signal occurs. This is done by correlating the received signal with the sweep signal, to get the correlogram such as 12. The "time" of the received signal, is the time corresponding to the vertical line 25 through the peak 24 of the principal lobe. The wavelet 12 is ideal, in that all practical wavelets have the side lobes 18 or 22 etc. If these are of large amplitude, as shown in FIGS. 1 and 2, then the principal lobe 14 is hard to distinguish, particularly, when naturally occurring noise is added to the traces shown. On the other hand, when the ideal wavelet 12 is obtained, even in the presence of noise, the principal lobe 24 of the wavelet is easily identified, whereas in the continuous ringing traces as in FIGS. 1 and 2 it is not.

I have discovered that by using a different sweep signal having different band width, having different terminal frequencies, both beginning and final frequencies, then even though there are prominent side lobes as in FIG. 1, if successive repetitions of the source are made, each with a different set of terminal frequencies, the apparent frequency of the side lobes 18, 22, will be different. As shown in FIGS. 1 and 2, for example, 18 is of a higher apparent frequency than is 22. If there are enough different sweep signals, with a wide enough range in terminal frequencies, then the resulting correlograms will have a side range of different frequencies of the side lobes.

Now, if the correlograms are stacked, then the multifrequency side lobes will tend to cancel each other (such as lobes 22A of FIG. 2 and 18A of FIG. 1, which are almost 180° out of phase). The sum trace will then approach the wavelet 12 when there are a large number of repetitions of the source. This is the desired result.

Figure 4:
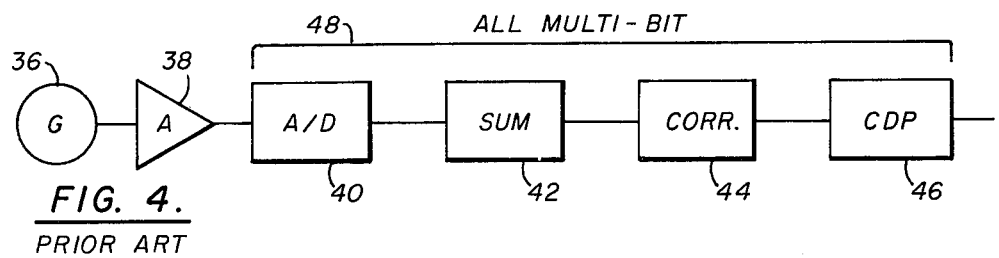
FIG. 4 shows the prior art processing of received vibratory seismic signals.

In FIG. 4, there is shown in block outline the present processing steps. The output of the geophone 36 goes to the binary gain floating point amplifier 38, the A/D converter 40, and to the summer 42, where the traces are stacked. Then the stacked record is correlated 44 with the sweep signal, and the resulting correlograms are CDP stacked 46. All the steps from digitization to CDP stacking are carried out with multi-bit digitization, generally 16 bits or more.

Figure 5:
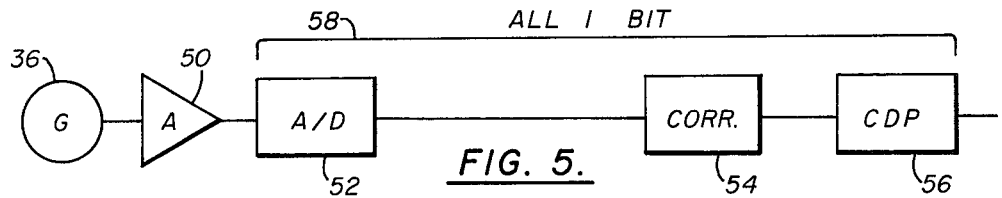
FIG. 5 shows the processing steps of this invention for vibratory seismic signals.
Figure 6:
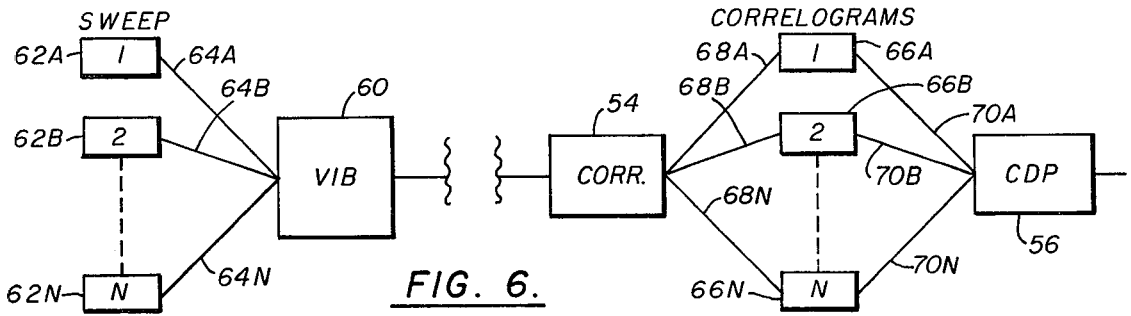
FIG. 6 illustrates the use of multiple different sweeps and CDP stacking the correlograms.

In FIGS. 5 and 6 is shown the important improvements of this invention. In FIG. 6 it is shown schematically that a plurality of different sweeps 62A, 62B . . . 62N, which are numbered 1,2 . . . N, are sequentially applied to the vibrator 60 in the normal way. The lines 64A, 64B . . . 64N indicate the successive passage of the different sweeps to the vibrator. The successive use of different sweeps is not now done, and prior art equipments are not adapted to do this. Thus, new equipment must be provided to permit this operation of changing the sweep on each successive operation of the vibrator.

Also, as shown in FIG. 5, if the sweep is changed on successive sweeps, it is important to correlate each sweep immediately with the corresponding received signal, otherwise it becomes necessary to separately record each of the different sweeps used, as well as the individual received signals.

In my copending application Ser. No. 617,858 of which this application is a continuation-in-part, I teach the great advantages of correlating before stacking, and in particular, correlating with a 1 bit digitized received signal and a 1 bit digitized sweep, to obtain a 1 bit digitized correlogram. In this form the 1 bit correlations can be done "on line," and at great speed.

Also, since the correlations are completed, the stacking can all be done as CDP stacking, instead of a combination of straight stacking and CDP stacking, as at present.

These steps of 1 bit digitization, 1 bit correlation, and CDP stacking are the invention in Ser. No. 617,858, In this invention I make use of these features in a new invention, namely the use of different sweeps on successive repetitions of the source, since they naturally aid and speed the processing of my received signals.

FIG. 5 is partially similar to FIG. 4, but is different in two important ways. In FIG. 4, the successive signals are stacked before being correlated. In FIG. 5 they are correlated before being stacked.

In FIG. 6 is shown the second important difference, namely, that a plurality of different sweeps are used, instead of a single sweep. So, out of the correlator 54 come a plurality of different correlograms, 66A, 66B . . . 66N, along lines 68A, 68B . . . 68N, each with different frequency side lobes. Because of the different frequencies of the side lobes, the summation or stacking after correlation provides an opportunity to statistically cancel part of the side lobe noise. Although the stacking after correlation is shown as CDP stacking, it will be clear that the correlograms can be straight stacked and then CDP stacked with a lesser "fold." The stacking of "different" correlograms is illustrated by the lines 70A, 70B . . . 70N.

Taught in my copending application Ser. No. 617,858 is the particular advantage of 1 bit digitization throughout the processing. This provides equal signal amplitude recovery, requires small computer memory, and offers more rapid processing. Also, because of the 1 bit signals, CDP gathers can be made and stored in a much greater fold number, with much greater power in signal enhancement.

As examples of the sweeps that might be used, a suite of sweeps as follows would show the improvement based on this invention. The sweeps range in frequency, as follows:
  a. 40 to 10 Hz
  b. 50 to 12.5 Hz
  c. 60 to 15 Hz
  d. 70 to 17.5 Hz
  e. 80 to 20 Hz
  f. 90 to 22.5 Hz
  g. 100 to 25 Hz These same frequency ranges could also be used in upsweep configurations, such as 10 to 40Hz, for example.

Another suite of sweeps might be as follows:
  a. 10 to 19.5 Hz
  b. 20 to 39.5 Hz
  c. 40 to 59.5 Hz
  d. 60 to 79.5 Hz, and so on.

While these sweeps are narrower in bandwidth and would have some larger side lobes, the resulting stacking would minimize this noise. Individually, each of the sweeps is narrower than 1 octave and would provide signals freer of ghosts due to harmonics, and so on.

While I illustrate my invention with suggested suites of sweeps, these are only by way of example and are not meant to be limiting. Also, while I prefer to carry out my operations in 1 bit processing this is not a limitation, and processing can be carried out in multibit form. Also, while I prefer to carry out all of my stacking as CDP stacking, this also is not a limitation, and the stacking can be carried out entirely as straight stacking, or as a combination of straight and CDP stacking.

In straight stacking, the successive repetitions of the source must be at the same point. In CDP stacking the successive repetitions of the source must be at different, spaced, independent points. If a combination of straight and CDP stacking is carried out, it will be clear that some repetitions are at the same point, and some at independent points.

A 1 bit digitized signal describes a square wave analog signal. A square wave analog signal, is the equivalent (in the Fourier plane) of a plurality of sinusoidal waves of different frequencies and amplitudes. Consequently, I have discovered that when a plurality of received signals and sweep signals are correlated and stacked, there will be less side lobe noise in the resulting stacked record, if they are correlated as 1 bit, rather than as multi bit signals.

While the invention has been described with a certain degree of particularity, it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed:

1. In a seismic recording and processing system in which at least one vibratory source is used to generate a seismic wave in the earth, and where a plurality of repetitions of the source are made, the improved method of operation directed to minimizing the correlation noise on the record, comprising the steps of;
  a. operating said at least one vibratory source with a first variable frequency reference sweep signal comprising a vibratory signal of selected starting and ending frequencies (terminal frequencies);
  b. detecting the first received signal resulting from said first sweep;
  c. correlating said first received signal with said first sweep to form a first correlogram;
  d. repeating steps (a), (b), (c) at least a second time with a second reference sweep signal having at least one terminal frequency which is different from that of said first reference sweep signal, to provide at least a second correlogram; and
  e. stacking said first and said at least second correlograms to provide a first stacked record.

2. The method as in claim 1 in which both of the terminal frequencies of the second reference sweep signal are different from those of said first reference sweep signal.

3. The method as in claim 1 in which the time length of each of said reference sweep signal is the same.

4. The method as in claim 1 in which the time length of at least two of said sweeps are different.

5. The method as in claim 1 in which the range of terminal frequencies is at least one-half octave.

6. The method as in claim 1 in which the number of repetitions of said source is in the range of 6–10, and in which the range of terminal frequencies is at least one octave.

7. The method as in claim 1 in which the number of repetitions of said source is in the range of 10–20.

8. The method as in claim 1 in which each repetition of said source is at the same source point.

9. The method as in claim 8 in which said correlograms are straight stacked.

10. The method as in claim 1 in which each repetition of said source is at a spaced independent point, and said correlograms are CDP stacked.

11. The method as in claim 1 including a plurality of vibrators in close spacing, each driven in synchronism with the same sweep.

12. The method as in claim 1 in which said received signals are 1 bit digitized and said sweep signals are 1 bit digitized, and said correlations are carried out between said two 1 bit digitized signals, to provide a multi bit digitized correlogram, which is digitized to 1 bit, and the 1 bit digitized correlograms are CDP stacked.

13. In a seismic recording and processing system in which at least one vibratory source is used to generate a seismic wave in the earth, and where a plurality of repetitions of the source are made, the improved method of operation directed to minimizing the correlation noise on the record, comprising the steps of;
  a. operating said at least one vibratory source with a first selected variable frequency reference sweep signal comprising a vibratory signal of selected band width and terminal frequencies, and having a first selected time duration;
  b. detecting the first received signal resulting from said first sweep;
  c. correlating said first received signal with said first sweep to form a first correlogram;
  d. repeating steps (a), (b) and (c) at least a second time with a reference sweep signal having a different time duration than said first sweep; and
  e. stacking said first and said at least second correlograms to provide a first stacked record.

14. The method as in claim 13 in which the band width and terminal frequencies are the same for each sweep.

15. The method as in claim 13 in which the band width and terminal frequencies of at least two of said sweeps are different.

16. The method as in claim 13 in which the number of repetitions of said source is in the range of 6–10 and in which the range of time durations is at least 2 to 1.

* * * * *

UNITED STATES PATENT AND TRADEMARK OFFICE
CERTIFICATE OF CORRECTION

PATENT NO. : 4,037,190
DATED : July 19, 1977
INVENTOR(S) : Lincoln A. Martin

It is certified that error appears in the above-identified patent and that said Letters Patent are hereby corrected as shown below:

Cover page, line [63], change "617,858" to --617,859--.

Signed and Sealed this

Tenth Day of October 1978

[SEAL]

Attest:

RUTH C. MASON
*Attesting Officer*

DONALD W. BANNER
*Commissioner of Patents and Trademarks*